United States Patent [19]

Obeda et al.

[11] 3,921,015

[45] Nov. 18, 1975

[54] HIGH VOLTAGE TRANSIENT PROTECTION MEANS AS FOR PIEZOELECTRIC TRANSDUCERS

[75] Inventors: Edward G. Obeda, Brookfield; George C. Kramer, Danbury, both of Conn.

[73] Assignee: Branson Ultrasonics Corporation, New Canaan, Conn.

[22] Filed: Aug. 1, 1974

[21] Appl. No.: 493,912

[52] U.S. Cl. .................................. 310/8.1; 318/116

[51] Int. Cl.$^2$ .......................................... H01L 41/10

[58] Field of Search ............. 310/8.1; 318/116, 118; 323/22 Z

[56] References Cited

UNITED STATES PATENTS

| | | | |
|---|---|---|---|
| 3,158,756 | 11/1964 | Brunner et al. | 323/22 Z |
| 3,263,092 | 7/1966 | Knauss | 323/22 Z |
| 3,308,373 | 3/1967 | Shaum | 323/22 Z |
| 3,443,130 | 5/1969 | Shoh | 310/8.1 |
| 3,582,733 | 6/1971 | Brubaker | 310/8.1 |
| 3,809,977 | 5/1974 | Balamuth et al. | 318/116 |

*Primary Examiner*—Mark O. Budd

*Attorney, Agent, or Firm*—Ervin B. Steinberg; Philip J. Feig

[57] ABSTRACT

This invention refers to a means for providing high voltage transient protection to piezoelectric wafers used in ultrasonic converters. The means is particularly useful in converters used for ultrasonic insertion applications.

10 Claims, 5 Drawing Figures

HIGH VOLTAGE TRANSIENT PROTECTION MEANS AS FOR PIEZOELECTRIC TRANSDUCERS

BRIEF SUMMARY OF THE INVENTION

This invention refers to ultrasonic energy sources and more specifically concerns high voltage surge protection of piezoelectric wafers used in ultrasonic converters. The invention is particularly useful for an ultrasonic apparatus used for inserting metal elements into thermoplastic material.

Certain ultrasonic converters are of the clamped transducer sandwich construction comprising a piezoelectric element clamped between two metal masses, the entire assembly being dimensioned to operate as a half wavelength resonator at a sonic, preferably ultrasonic, frequency. When the piezoelectric element is energized with a high voltage alternating current electrical signal of predetermined frequency, the converter converts the applied high frequency electrical energy to mechanical vibration and transmits the vibration to a horn which is connected to the transducer sandwich. The repetitive high impact force of the resonating horn frontal surface upon a metal element causes the insertion of the element into a plastic body. The impact is in the order of several thousand g's at a typical repetition rate of approximately 20 kHz. The impact of the horn's frontal surface upon the metal element, also known as insert, causes the piezoelectric element to deform mechanically and such deformation, in turn, results in a high voltage transient across the piezoelectric element, typically a wafer. The high voltage transient may cause arcing across the thin wafer leading to failure of the converter. A typical converter construction is shown in U.S. Pat. No. 3,328,610, dated June 27, 1967, issued to S. E. Jacke et al., entitled "Sonic Wave Generator", and the method of inserting a metal element into a plastic body by means of ultrasonic energy is shown in U.S. Pat. No. 3,184,353, data May 18, 1965, issued to L. Balamuth, entitled "Fastening Together of Members by High Frequency Vibrations" which patents are incorporated herein for reference.

In the prior art there always has been the problem of insulating the piezoelectric wafer or stack of wafers against high voltage flashover and electrical breakdown. The piezoelectric wafer is connected in circuit in a manner whereby one side of the thin wafer is connected to high voltage and the other side is connected to ground. In a power transducer, the piezoelectric wafer has applied across its relatively thin width a voltage potential in the order of 1,000 volts or more. The insulating problem is increased in the case of an ultrasonic insertion apparatus. Insertion of metal into plastic requires the use of a repetitive high impact force by the converter upon the metal insert in a direction parallel to the major axis of the horn and such high impact force causes the piezoelectric wafers to deform. The property of piezoelectric material is such that a deformation causes a resultant output voltage transient across the piezoelectric wafer. The voltage transient, which may be of considerable amplitude, can cause arcing across the piezoelectric wafer, the high voltage connector, or the output transistors of the electrical generator coupled in circuit with the converter.

The present invention provides electrical circuit means coupled in circuit with the piezoelectric element for effecting electrical transient suppression, thereby protecting the converter unit as well as the power supply energizing the converter unit.

A principal object of the present invention, therefore, is the provision of means for protecting the piezoelectric stack and associated circuits from high voltage breakdown during the process of ultrasonically inserting metals into plastic material.

Another important object of this invention is the provision of an electrical circuit for use as a voltage surge suppression device in an ultrasonic converter.

Another salient feature of this invention is the provision of means for greatly improving the reliability of an ultrasonic insertion apparatus by reducing failures related to high voltage arcing in the converter assembly.

Further and still other objects of the present invention will become more clearly apparent from the description when taken in conjunction with the accompanying drawings.

DETAILED DESCRIPTION OF THE INVENTION

Figures 1, 5:
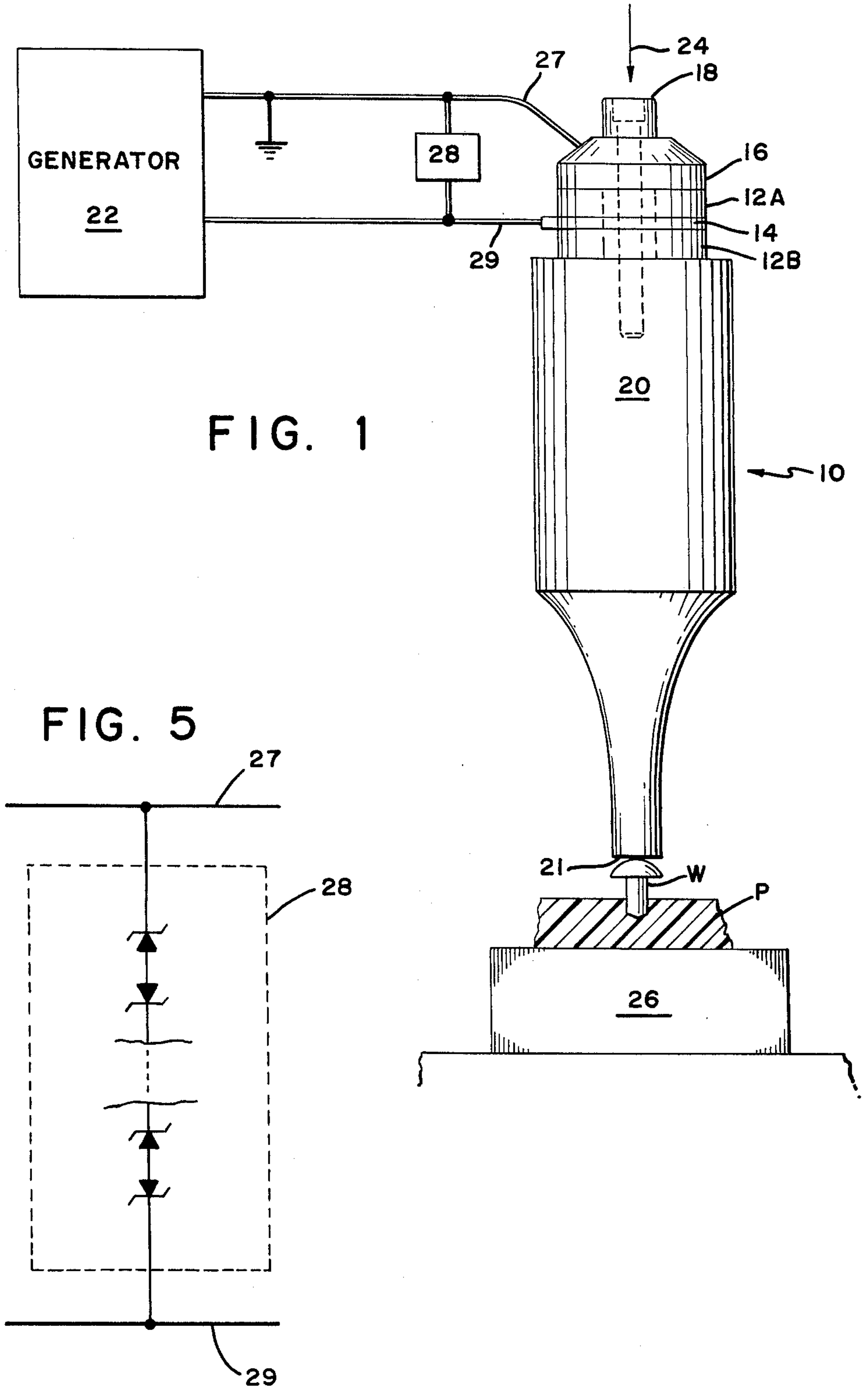
FIG. 1 is an elevational view, partly in section of an embodiment of the present invention.
FIG. 5 is a schematic electrical circuit diagram of a still further alternative embodiment of the voltage limiting means.

Referring now to FIG. 1, numeral 10 generally identifies an ultrasonic energy converter. Two piezoelectric wafers 12A and 12B have a central metallic high voltage electrode 14 disposed therebetween. The back plate 16 can be an electrically conductive material and is at the same electrical potential as the front transducer portion (ground potential).

A horn 20 is coupled mechanically to the piezoelectric wafers by means of a compression bolt 18 threaded into the larger end of the horn. The entire assembly is dimensioned to be resonant as a half wavelength resonator at the predetermined frequency of sound traveling longitudinally through the assembly.

Generator 22 provides an electrical excitation signal which the piezoelectric wafers convert to mechanical vibration The wafers and the horn thereby mechanically vibrate at the resonant frequency, preferably at an ultrasonic frequency.

For insertion of a metal insert W into a plastic workpiece P, which is supported by an anvil 26, the frontal end 21 of the horn 20 is brought into forced engagement with the metal insert W by applying an engagement force between the converter unit 10 and the metal insert W in the direction indicated by the arrow 24 and then the generator 22 is energized to cause superimposed high frequency vibration at the horn's frontal surface 21. The repetitive impact, usually in the range from 20 to 50 kHz and an amplitude of 0.002 to 0.004 inch peak to peak, is characterized by an impact force of several thousand g. This impact is reflected back by the horn to the wafers 12B and 12A and due to the piezoelectric effect, the impact shocks cause high voltage surges or voltage spikes across each of the wafers. Essentially, these spikes may be compared with voltage transients between the electrode 14 and ground potential.

The high voltage transient causes a breakdown of the piezoelectric material and, hence, failure of the converter 10. In the present invention, a voltage limiting or surge protection means 28 is connected between the high voltage electrode 14 and ground to suppress the occurrence of high voltage transients at the converter and/or at the output stage of the generator 22. The voltage limiting means 28, preferably, is mounted within the protective casing (not shown) normally surrounding the converter assembly 10, see Jacke et al supra.

The surge suppression means 28 ideally exhibits the characteristic of appearing as an open circuit until a predetermined voltage is present across the conductors 27 and 29. When the voltage exceeds the predetermined voltage, the surge suppression means acts as a short circuit to the high voltage transient, absorbing the increased energy, thereby protecting the piezoelectric wafers and the associated circuits comprising the connectors and the output portion of generator 22 which could be damaged by a non-suppressed high voltage transient.

In a preferred embodiment, the voltage limiting means 28 comprises the series connection of a plurality of zener diodes or metal oxide varistors, see FIG. 5. Typically, the maximum voltage between the high voltage electrode 14 and ground when the converter is operating at maximum energy is approximately 2000 volts. In this case the voltage limiting means 28 is dimensioned to suppress a transient in excess of 2400 volts to minimize the effect of the non-ideal characteristics of the zener diodes or varistors. The piezoelectric wafer stack and the output stage of the generator 22 are designed to withstand an electrical potential of at least 2400 volts.

The voltage limiting means 28, aside from zener diodes, such as Motorola 1N3051, or metal oxide varistors, such as General Electric V460LB40B, may comprise other surge suppression means as are known in the art and these means can be disposed also in the generator 22. To afford optimum protection, the voltage limiting means 28 should be coupled from the high voltage electrode 14 to ground via short conductors.

High voltage arcing in converters when ultrasonically inserting a metal element into a plastic body is caused, as stated heretofore, by voltage transients due to the mechanical deformation of the piezoelectric wafers resulting from the impact between the frontal surface 21 of the horn and the workpiece. The deformation of the piezoelectric wafers 12A and 12B produces a high voltage alternating current electrical signal superimposed on the signal from the generator 22, to create a resultant high voltage in excess of the breakdown voltage of the piezoelectric wafers 12A and 12B, the connector, or the output portion in the generator 22. It is, of course, understood that the transient voltage may have either a positive or negative polarity. Therefore, the converter must be protected from voltage transients having either a positive or negative polarity as shown in FIG. 5.

Figure 2:
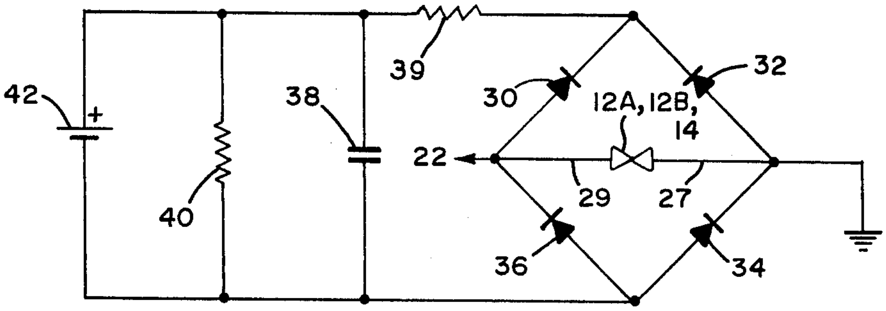
FIG. 2 is a schematic electrical circuit diagram of an alternative embodiment of the voltage limiting means.

An alternative embodiment of the voltage limiting means 28 is shown in FIG. 2. An electrical bridge circuit, comprising diodes 30, 32, 34 and 36, is used to limit the amplitude of any voltage transient to the amplitude of a power supply 42. (In the present example the resistors 39, 40 and the capacitor 38 are omitted.) The potential of the power supply 42 is set to a predetermined amplitude only slightly above the peak value of the voltage between conductor 29 and ground. A positive voltage transient exceeding the predetermined voltage across the conductors 27 and 29 will render diodes 30 and 34 conductive. The voltage limiting action of the diodes 30 and 34 causes the voltage between conductors 29 and ground not to exceed the sum of the voltages across diode 30, power suppply 42 and diode 34. The maximum voltage at electrode 14 will essentially be equal to the predetermined voltage amplitude of power supply 42. In a like manner, a negative transient will render diodes 32 and 36 conductive and these diodes limit the voltage between the conductor 29 and ground to the voltage amplitude of power supply 42. In the present embodiment, the predetermined voltage amplitude is selected to be a value just slightly above the peak value of the voltage between conductor 29 and ground. The predetermined voltage amplitude selected is smaller than the voltage amplitude of 2400 volts selected in the example stated hereinabove employing zener diodes and varistors.

In a modification of the bridge circuit shown in FIG. 2, the power supply 42 is omitted, but the resistors 39, 40 and capacitor 38 are connected as shown in FIG. 2. In this case, when the piezoelectric wafers 12A and 12B are energized by generator 22, the capacitor 38 is charged via diodes 30 and 34, or diodes 32 and 36, and resistor 39 to substantially the peak value of the voltage between conductor 29 and ground. A positive transient exceeding the voltage across capacitor 38 will cause diodes 30 and 34 to become conductive and thereby limit the voltage between conductor 29 and ground to substantially the voltage across the terminals of the capacitor 38. A negative voltage transient is suppressed in a like manner when diodes 32 and 36 are rendered conductive. Typically resistor 39 is less than 10 ohms, resistor 40 is several thousand ohms, and capacitor 38 is several hundred microfarads.

Figure 3:
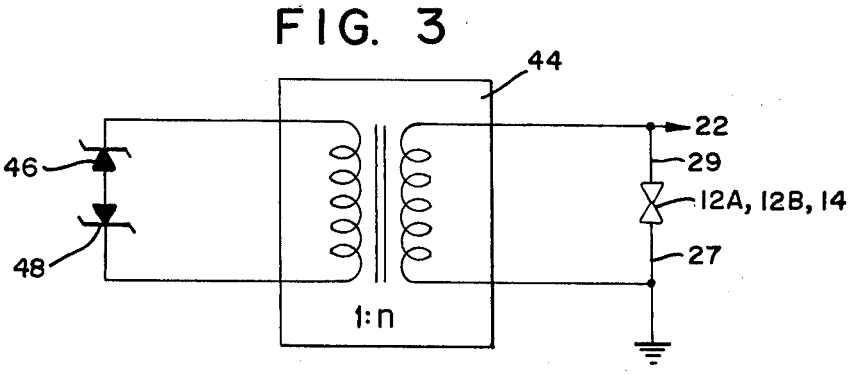
FIG. 3 is a schematic electrical circuit diagram of another alternative embodiment of the voltage limiting means.

In the alternative embodiment as shown in FIG. 3, transformer 44 is disposed in circuit with the piezoelectric wafers 12A and 12B. The turns ratio is selected as 1 to $n$. A transient voltage spike on conductor 29 is transformed to a spike whose amplitude is reduced by a factor of $n$ on the low voltage side of transformer 44. Voltage limiting means, such as zener diodes or varistors are in circuit on the low voltage side of transformer 44 to suppress voltage transients exceeding the predetermined voltage across piezoelectric wafers 12A and 12B divided by a factor of $n$. The voltage limiting means 46 and 48, shown as zener diodes are disposed in circuit as shown to suppress both positive and negative transients. In a typical example, to limit the voltage between conductor 29 and ground to 2000 volts, a transformer 44 having a turns ratio of 10 is used and the voltage limiting zener diodes 46 and 48 are selected with a zener breakdown voltage of 200 volts.

Figure 4:
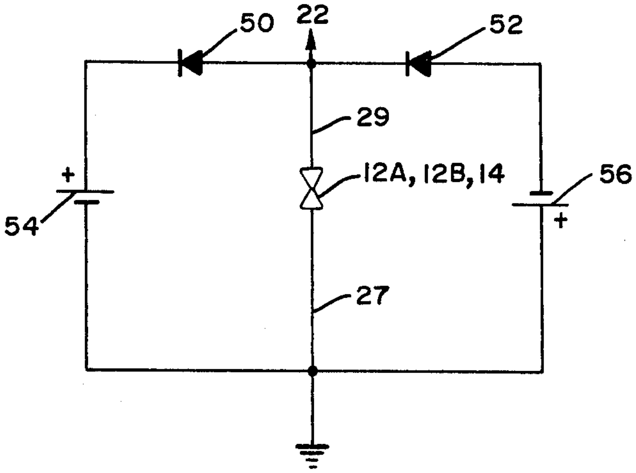
FIG. 4 is a schematic electrical circuit diagram of a further alternative embodiment of the voltage limiting means.

In an additional embodiment illustrated in FIG. 4, the piezoelectric wafers 12A and 12B are coupled in circuit with diodes 50 and 52 and their respective power supplies 54 and 56. The diodes 50 and 52 will conduct if a respective positive or negative voltage transient exceeds the predetermined value of power supplies 54 and 56. When either diode conducts, the voltage on conductor 29 cannot exceed the amplitude of the power supplies due to the voltage limiting action of the respective current conducting diode.

It will be apparent that the above described improvements to the existing apparatus constitute a significant advance in the art. The addition of voltage limiting means will permit the use of higher engagement force in ultrasonic insertion applications without the heretofore known problem of high voltage arcing in the ultrasonic converter assembly. It has been found that the implementation of the above described improvement greatly increases the reliability of ultrasonic insertion apparatus.

While there has been described and illustrated preferred embodiments of the present invention pertaining to voltage limiting means as applied to ultrasonic converters used in insertion apparatus, the invention is also most useful when applied to an ultrasonic converter used in applications where the horn exhibits hammer like contact with a metal workpiece. It will be apparent to those skilled in the art that various changes and modifications can be made without deviating from the broad principle of the invention.

What is claimed is:

1. An ultrasonic converter for use in an insertion apparatus comprising:

piezoelectric wafer means having electrode means, said wafer means providing mechanical high frequency vibration in response to electrical excitation applied to said electrode means;

horn means coupled to said piezoelecric wafer means for transmitting mechanical energy from said piezoelectric means to a workpiece in contact with the front surface of said horn means, electrical generating means coupled to said electrode means for causing said piezoelectric wafer means and said horn means to be resonant, and voltage limiting means coupled to said electrode means to suppress high voltage transients across said piezoelectric wafer means resulting from mechanical impact between said front surface and workpiece.

2. An ultrasonic converter for use in an insertion apparatus as set forth in claim 1, said voltage limiting means comprising a plurality of zener diodes.

3. An ultrasonic converter for use in an insertion apparatus as set forth in claim 1, said voltage limiting means comprising a plurality of varistors.

4. An ultrasonic converter for use in an insertion apparatus as set forth in claim 1, said piezoelectric wafer means comprising at least one disk.

5. An ultrasonic converter for use in an insertion apparatus as set forth in claim 1, said voltage limiting means being mounted within the casing surrounding said converter.

6. An ultrasonic converter for use in an insertion apparatus as set forth in claim 1, said voltage limiting means being mounted to said electrical generating means.

7. An ultrasonic converter for use in an insertion apparatus as set forth in claim 1, said voltage limiting means being rendered conductive at a predetermined voltage.

8. An ultrasonic converter for use in an insertion apparatus as set forth in claim 1, said voltage limiting means comprising an electrical bridge circuit.

9. An ultrasonic converter for use in an insertion apparatus as set forth in claim 1, said voltage limiting means comprising a transformer and voltage limiting means.

10. An ultrasonic converter for use in an insertion apparatus as set forth in claim 1, said voltage limiting means comprising at least one diode coupled in circuit with an electrical power supply.

* * * * *